US009958726B2

(12) United States Patent
Fan

(10) Patent No.: US 9,958,726 B2
(45) Date of Patent: May 1, 2018

(54) HIGHLY-REFLECTIVE LIQUID CRYSTAL ON SILICON PANEL COMPRISING A CONTINUOUS REFLECTIVE COATING COVERING PIXEL ELECTRODES AND AN INTER-PIXEL COATING

(71) Applicant: OmniVision Technologies, Inc., Santa Clara, CA (US)

(72) Inventor: Chun-Sheng Fan, Zhudong Township (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 137 days.

(21) Appl. No.: 14/631,390

(22) Filed: Feb. 25, 2015

(65) Prior Publication Data

US 2016/0246115 A1  Aug. 25, 2016

(51) Int. Cl.
*G02F 1/1335* (2006.01)
*G02F 1/1343* (2006.01)
*G02F 1/1362* (2006.01)

(52) U.S. Cl.
CPC .... *G02F 1/133553* (2013.01); *G02F 1/13439* (2013.01); *G02F 1/136277* (2013.01)

(58) Field of Classification Search
CPC .......... G02F 1/133553; G02F 1/13439; G02F 1/136277
See application file for complete search history.

(56) References Cited

U.S. PATENT DOCUMENTS

| 6,124,912 | A | * | 9/2000 | Moore | G02F 1/133502 |
| | | | | | 348/E9.027 |
| 6,774,955 | B2 | * | 8/2004 | Chung | G02F 1/13394 |
| | | | | | 349/113 |
| 7,474,371 | B2 | * | 1/2009 | Wu | G02F 1/133553 |
| | | | | | 349/113 |
| 8,681,283 | B2 | | 3/2014 | Li et al. | |
| 2007/0026679 | A1 | * | 2/2007 | Yu | G02F 1/133553 |
| | | | | | 438/690 |
| 2008/0094690 | A1 | * | 4/2008 | Luo | G02B 26/001 |
| | | | | | 359/318 |

(Continued)

FOREIGN PATENT DOCUMENTS

WO    0195619 A2    12/2001

OTHER PUBLICATIONS

Lazarev, et al. "LCOS Spatial Light Modulators: Trends and Applications" Optical Imaging and Metrology: Advanced Technologies, First Edition, 2012.

(Continued)

*Primary Examiner* — Paul Lee
(74) *Attorney, Agent, or Firm* — Lathrop Gage LLP

(57) ABSTRACT

A highly-reflective liquid crystal on silicon (LCOS) panel includes pixel electrodes on a substrate, each pixel electrode having a top surface with a first reflectivity. A continuous reflective coating covers the pixel electrodes and substrate surfaces therebetween, forming a plurality of coated pixel electrodes having an enhanced reflectivity that exceeds the first reflectivity. A method for increasing pixel reflectivity in a LCOS panel includes depositing a continuous reflective coating covering both (1) a plurality of pixel electrodes on a substrate and (2) a plurality of inter-pixel substrate surfaces, and depositing a layer on the continuous reflective coating.

6 Claims, 14 Drawing Sheets

(56) References Cited

U.S. PATENT DOCUMENTS

| | | | | |
|---|---|---|---|---|
| 2008/0129911 A1* | 6/2008 | Huang | ............ | G02F 1/136209 |
| | | | | 349/44 |
| 2009/0128767 A1 | 5/2009 | Suezaki et al. | | |
| 2009/0128768 A1* | 5/2009 | Kar-Roy | ........... | G02F 1/136277 |
| | | | | 349/155 |
| 2009/0257113 A1* | 10/2009 | Smith | ................. | G02B 26/001 |
| | | | | 359/321 |
| 2010/0072481 A1* | 3/2010 | Xiang | .............. | G02F 1/133553 |
| | | | | 257/72 |

OTHER PUBLICATIONS

Taiwanese Patent Application No. 105105734, English translation of Office Action dated Jun. 29, 2017, 10 pages.

* cited by examiner

HIGHLY-REFLECTIVE LIQUID CRYSTAL ON SILICON PANEL COMPRISING A CONTINUOUS REFLECTIVE COATING COVERING PIXEL ELECTRODES AND AN INTER-PIXEL COATING

BACKGROUND

This invention relates to the manufacture of liquid-crystal-on-silicon (LCOS) displays, and particularly, LCOS displays with enhanced reflectivity.

LCOS displays are used in consumer electronics, such as hand-held projectors and near-eye displays, and also have applications in optical communications technologies. LCOS displays include a reflective LCOS panel that contains a pixel array formed on a semiconductor wafer.

SUMMARY OF THE INVENTION

In an embodiment, a highly-reflective LCOS panel includes pixel electrodes on a substrate, each pixel electrode having a top surface with a first reflectivity. A continuous reflective coating covers the pixel electrodes and substrate surfaces therebetween, forming a plurality of coated pixel electrodes having an enhanced reflectivity that exceeds the first reflectivity.

In another embodiment, a highly-reflective LCOS panel includes pixel electrodes on a substrate and having a top surface having a first reflectivity, a reflective coating on each pixel electrode and having a top surface at a first height above the substrate, and an anti-reflective coating on substrate regions between adjacent electrodes and having a second height equal to the first height, the anti-reflective coating and pixel electrodes forming a planar surface. The pixel electrodes with the reflective coating thereon have an enhanced reflectivity that exceeds the first reflectivity. The substrate with the anti-reflective coating thereon has a reduced reflectivity less than a reflectivity of the substrate.

In an embodiment, a method for increasing pixel reflectivity in a LCOS panel includes depositing a continuous reflective coating covering both (1) a plurality of pixel electrodes on a substrate and (2) a plurality of inter-pixel substrate surfaces, and depositing a layer on the continuous reflective coating.

DETAILED DESCRIPTION

Figure 1:
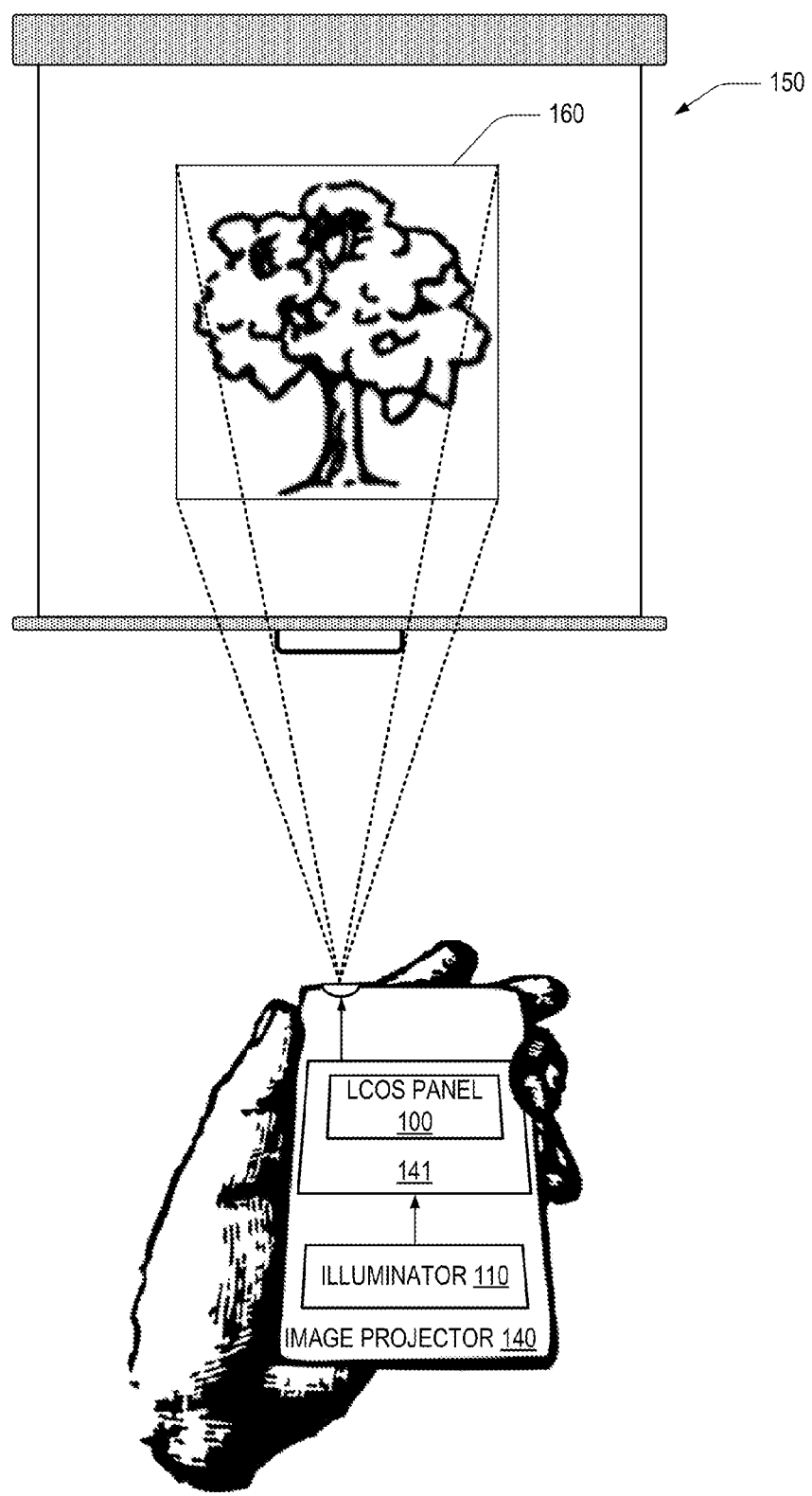
FIG. 1 shows one exemplary use of a reflective LCOS panel within a projector assembly of a hand-held image projector.

FIG. 1 shows one exemplary use of a reflective LCOS panel 100 within a projector assembly 141 of a hand-held image projector 140 that projects an image 160 onto a screen 150. Reflective LCOS panel 100 is illuminated by an illuminator 110. Reflective LCOS panel 100 may alternately be employed in a different display device, such as in a see-through head-mounted display system.

Figure 2:
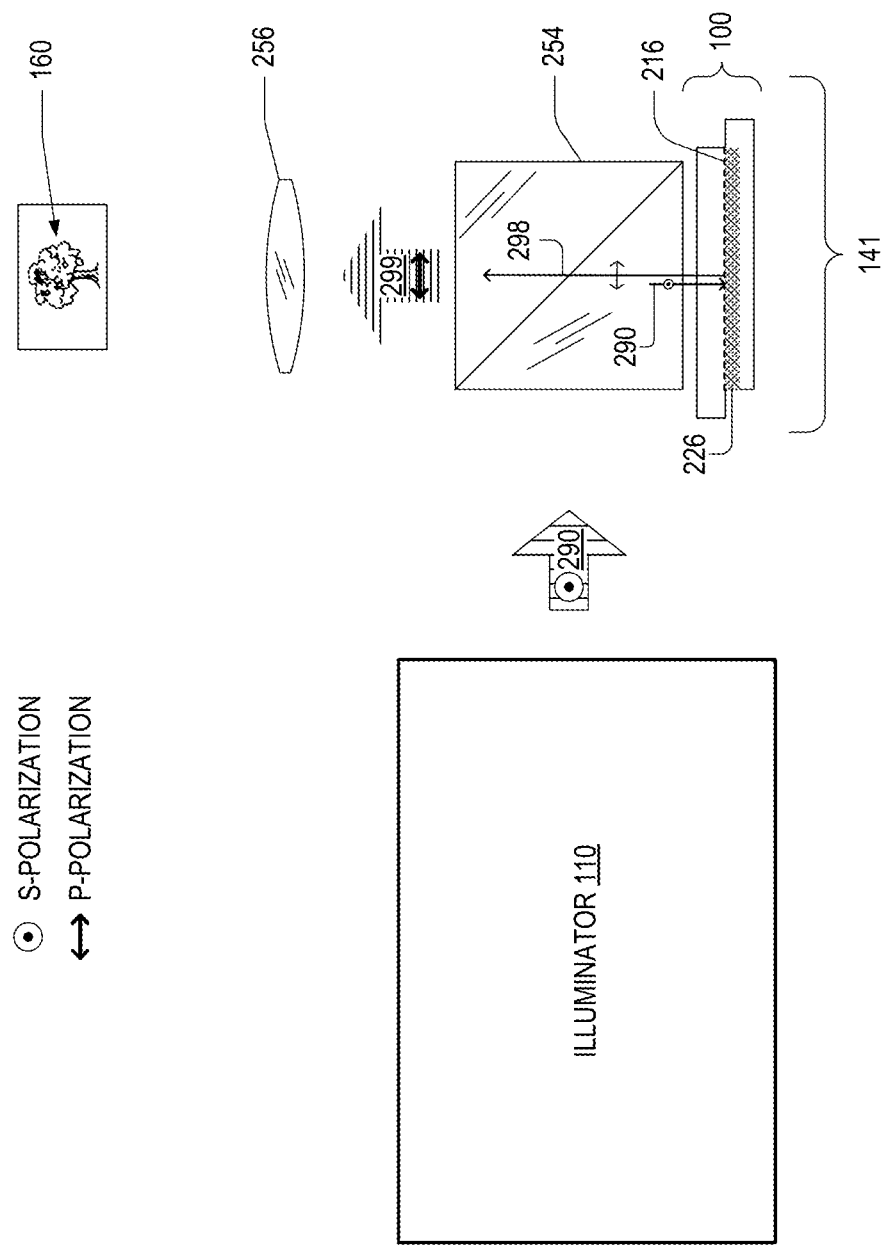
FIG. 2 is a detailed view of the projector assembly of FIG. 1.

FIG. 2 illustrates a detailed view of projector assembly 141. Illuminator 110 emits an s-polarized output beam 290 toward projector assembly 141. In FIG. 2, s-polarization and p-polarization refer to electric field components normal to the figure plane, and parallel to the figure plane, respectively. Projector assembly 141 includes reflective LCOS panel 100, a polarizing beamsplitter (PBS) cube 254, and a projector lens 256.

Output beam 290 is incident on PBS cube 254. PBS cube 254 reflects output beam 290 to reflective LCOS panel 100, which spatially modulates and reflects output beam 290 as p-polarized beam 298 that is transmitted through PBS cube 254 and projected by projector lens 256 as a projected beam 299. Projected beam may be imaged as image 160.

The quality of image 160 depends in part on the intensity of p-polarized beam 298, which depends on the reflectivity of reflective LCOS panel 100. Reflective LCOS panel 100 includes a pixel array 226 formed a plurality of pixels each having a pixel electrode 216, the reflectivity of which largely determines the reflectivity of reflective LCOS panel 100, and hence the quality of the projected image.

Figure 3:
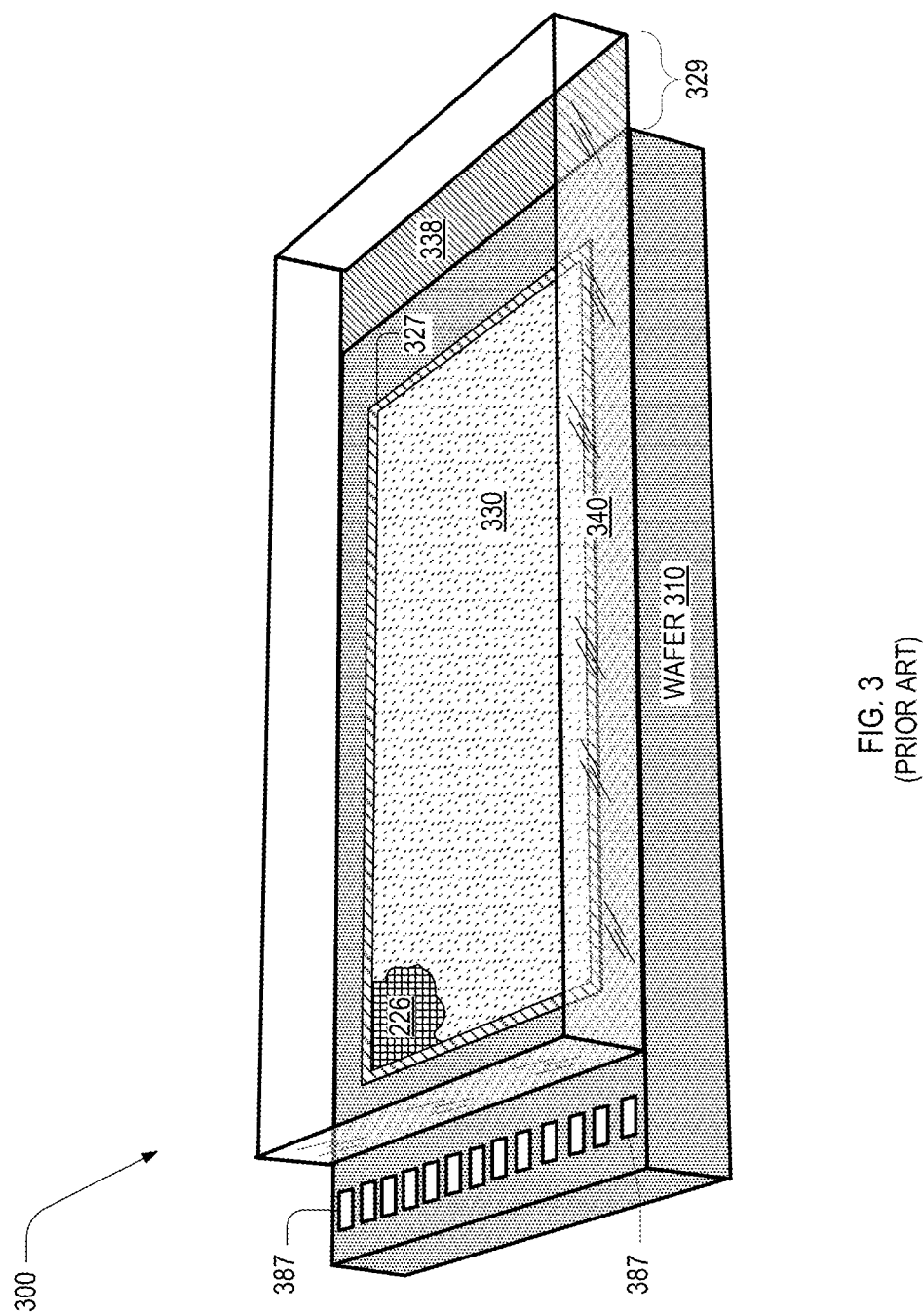
FIG. 3 is a perspective view of a prior-art reflective LCOS panel.

FIG. 3 is a perspective view of a prior-art reflective LCOS panel 300, which may replace LCOS panel 100 in projector assembly 141. Prior-art reflective LCOS panel 300 includes a cover glass 340 on a semiconductor wafer 310. A liquid crystal layer 330 is between cover glass 340 and semiconductor wafer 310. Pixel array 226 is between the liquid crystal layer 330 and semiconductor wafer 310. A corner portion of liquid crystal layer 330 is not shown to reveal pixel array 226 beneath it. Semiconductor wafer 310 includes a plurality of bond pads 387 that control each pixel of pixel array 226.

A transparent conductive layer 338 is on the surface of cover glass 340 adjacent to liquid crystal layer 330. For clarity of illustration, FIG. 3 shows only a portion of conductive layer 338 on overhang region 329 of cover glass 340. A dam 327 contains liquid crystal layer 330. Transparent conductive layer 338 is deposited on cover glass 340, and is, for example, formed of indium titanium oxide (ITO).

Figure 4:
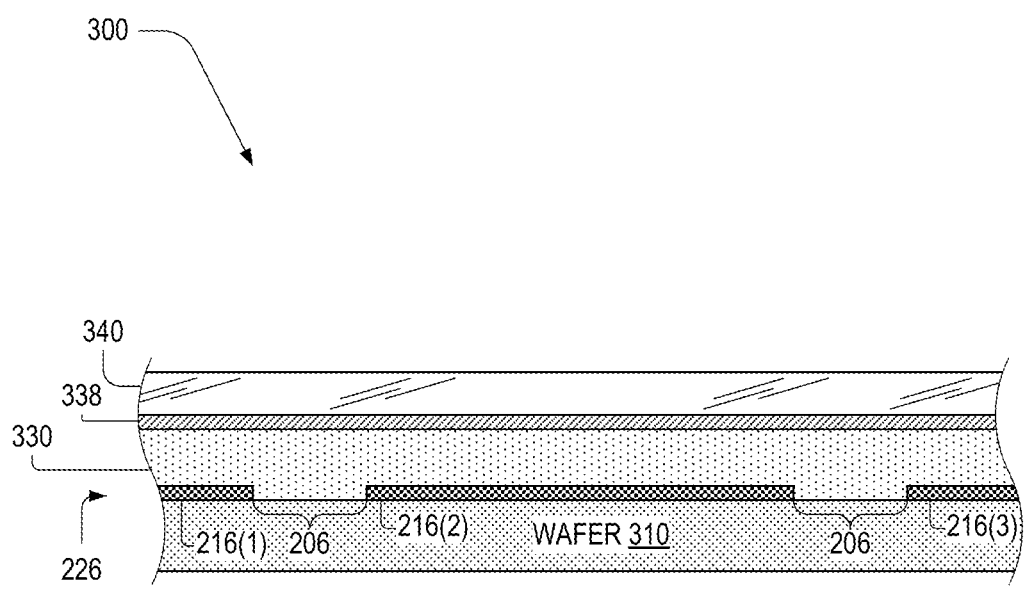
FIG. 4 is a cross-sectional view of a portion of the prior-art reflective LCOS panel of FIG. 3.

FIG. 4 is a cross-sectional view of a portion of prior-art reflective LCOS panel 300 showing portions of semiconductor wafer 310, pixel array 226, liquid crystal layer 330, transparent conductive layer 338, and cover glass 340. Pixel electrodes 216(1-3) of pixel array 226 are separated by inter-pixel gaps 206. Pixel electrodes 216 are typically formed of aluminum, which has a refractive index of n=0.95+6.4 i at $\lambda_0$=546 nm and a corresponding normal-incidence reflectivity of $R_{Al}$=91% when the incident medium has a refractive index n=1.0.

Increasing the reflectivity of pixel electrode 216 of prior-art reflective LCOS panel 300 can enhance the quality of image 160 formed by projector assembly 141. Existing methods of increasing pixel reflectivity include depositing a reflective thin-film coating on each pixel electrode 216. For example, U.S. patent publication number US2008/0106677 to Kuan et al. describes three different reflection layers on pixel electrodes of each of a red, a green, and a blue sub-pixel included in each pixel. A disadvantage of this approach is the process requires applying a different reflective coating to each type of sub-pixel electrode. For example, referring to FIG. 4, pixel electrodes 216(1), 216(2), and 216(3) would each have a different narrow-band coating designed to reflect one of red, green, and blue light. Since a typical width of a pixel electrode of a reflective LCOS panel is less than ten microns, the process of forming a patterned array of different narrow-band reflective films aligned to pixel electrodes 216 is not trivial.

Forming a single broadband reflective coating spanning the visible portion of the electromagnetic spectrum over all pixel electrodes would be a much simpler and cost-effective method of increasing pixel electrode reflectivity. In US2008/0106677, the color selectivity of the reflective LCOS panel results from each sub-pixel electrode reflecting one of red, green, and blue light. By contrast, color selectivity of an LCOS panel with a broadband reflective coating common to all pixel electrodes would not differentiate pixels by color reflectivity. Rather, reflectivity of different colors may be achieved by a field-sequential method, as known in the art.

Figure 5:
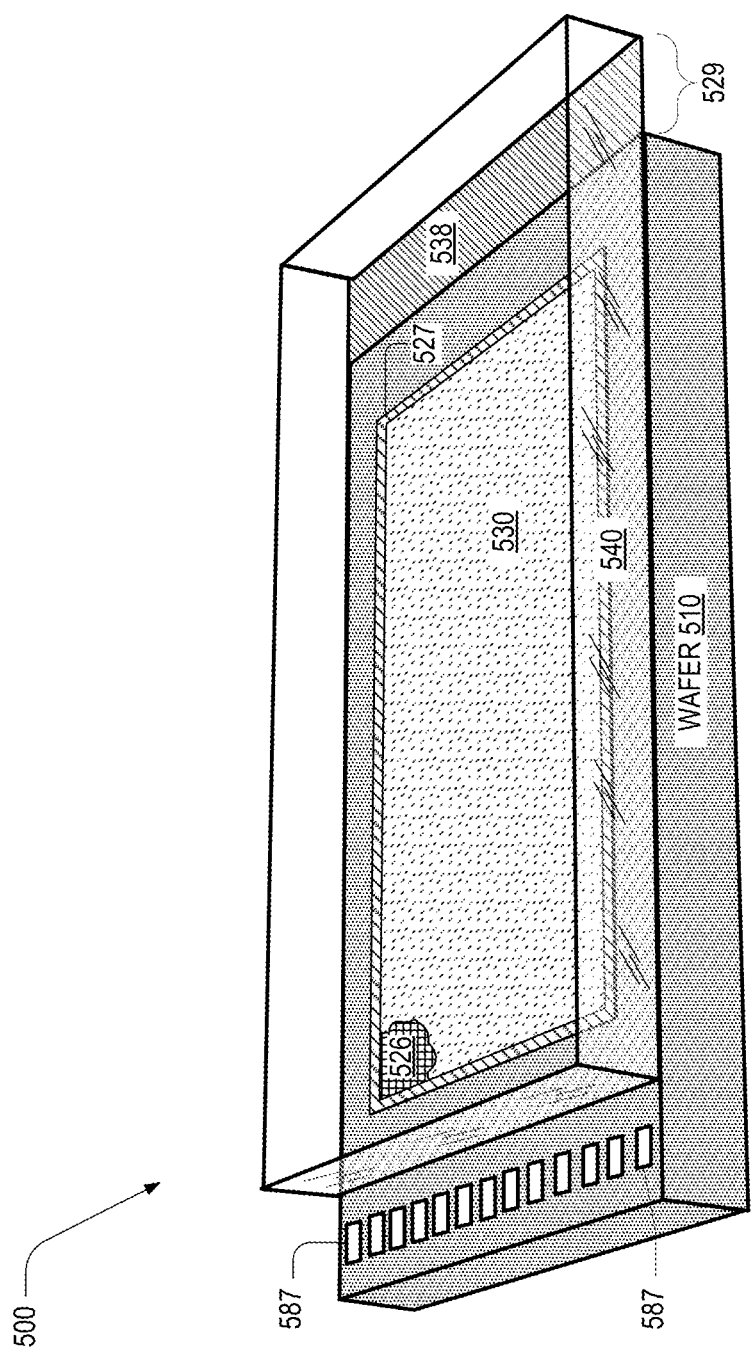
FIG. 5 is a perspective view of an exemplary highly-reflective LCOS panel, in an embodiment.

FIG. 5 is a perspective view of a highly-reflective LCOS panel 500 that may replace LCOS panel 100 in projector assembly 141. Highly-reflective LCOS panel 500 includes a cover glass 540 on a semiconductor wafer 510. A liquid crystal layer 530 is between cover glass 540 and semiconductor wafer 510. A pixel array 526 is between the liquid crystal layer 530 and semiconductor wafer 510. A corner portion of liquid crystal layer 530 is not shown to reveal pixel array 526 beneath it. Pixel array 526 includes a plurality of pixels each with a respective pixel electrode 516, not shown in FIG. 5. Semiconductor wafer 510 includes a plurality of bond pads 587 that control each pixel of pixel array 526.

A transparent conductive layer 538 is on the surface of cover glass 540 adjacent to liquid crystal layer 530. For clarity of illustration, FIG. 5 shows only a portion of transparent conductive layer 538 on overhang region 529 of cover glass 540. A dam 527 contains liquid crystal layer 530. Semiconductor wafer 510, liquid crystal layer 530, transparent conductive layer 538, and cover glass 540, are similar to semiconductor wafer 310, liquid crystal layer 330, transparent conductive layer 338, and cover glass 340 of FIG. 3, respectively.

Figure 6:
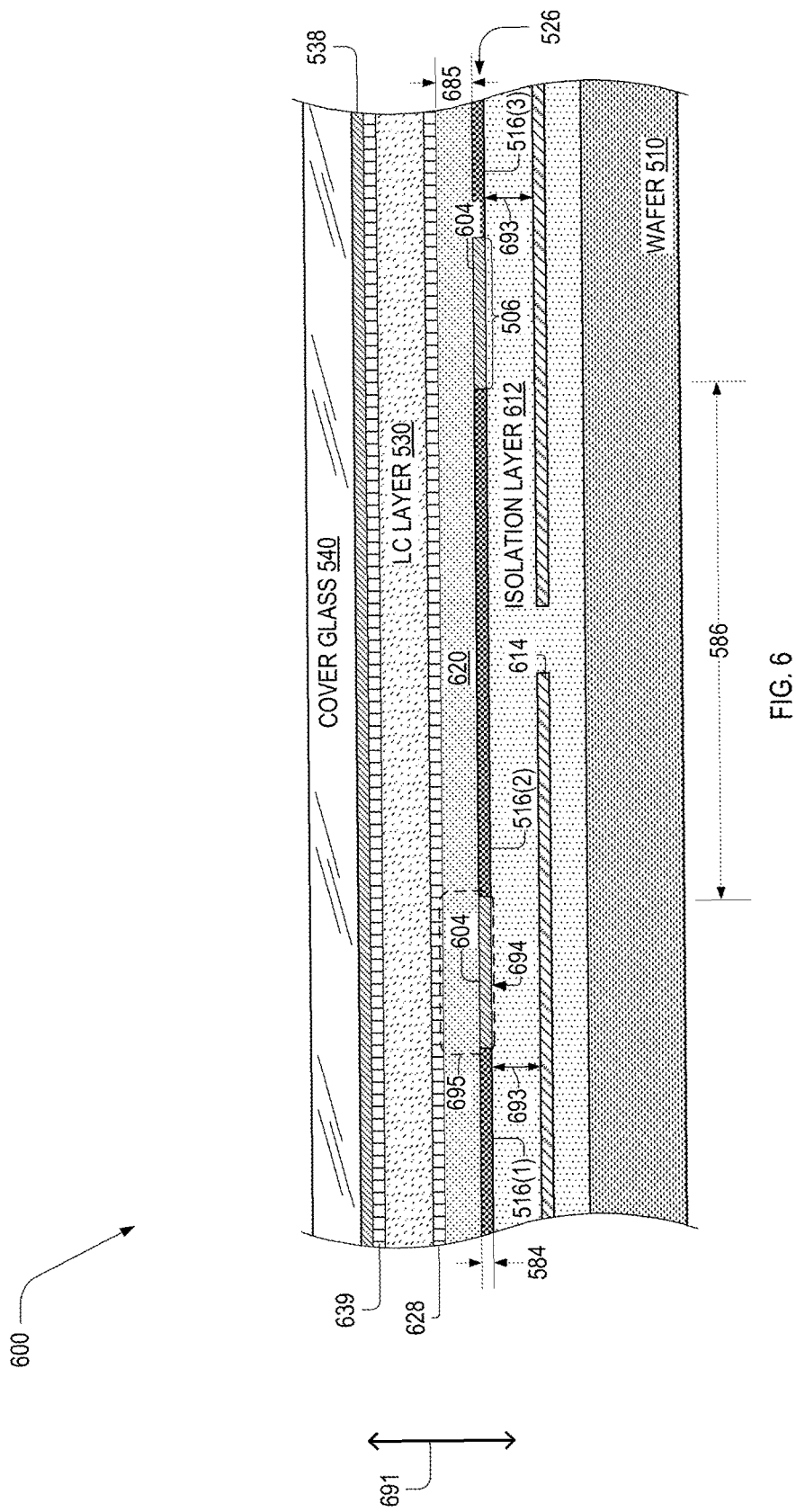
FIG. 6 is a cross-sectional view showing a portion of the highly-reflective LCOS panel of FIG. 5 having inter-pixel coatings, in an embodiment.

FIG. 6 is a cross-sectional view of a portion of a highly-reflective LCOS panel 600. Highly-reflective LCOS panel 600 is an embodiment of highly-reflective LCOS panel 500, and includes semiconductor wafer 510, an isolation layer 612, pixel array 526, a reflective coating 620, a bottom alignment layer 628, liquid crystal layer 530, transparent conductive layer 538, a top alignment layer 639, and cover glass 540. In certain embodiments, isolation layer 612 may be formed of silicon nitride and includes a light-blocking layer 614, which may be formed of an optically opaque material such as a metal. Pixel array 526 includes pixel electrodes 516(1-3). Pixel electrodes 516(1-3) of pixel array 526 are separated by inter-pixel gaps 506. Light-blocking layer 614 may be formed entirely, or in part, of non-metallic materials without departing from the scope hereof.

An inter-pixel coating 604 is between each pair of adjacent pixel electrodes 516. Each electrode 516 may be formed of aluminum and has a width 586 and a height 584. Width 586 may be between five microns and ten microns, 6.4 microns for example. A distance 693 separates light-blocking layer 614 and inter-pixel coating 604. Electrodes 516 may be formed of metals other than aluminum without departing from the scope hereof.

Figure 7:
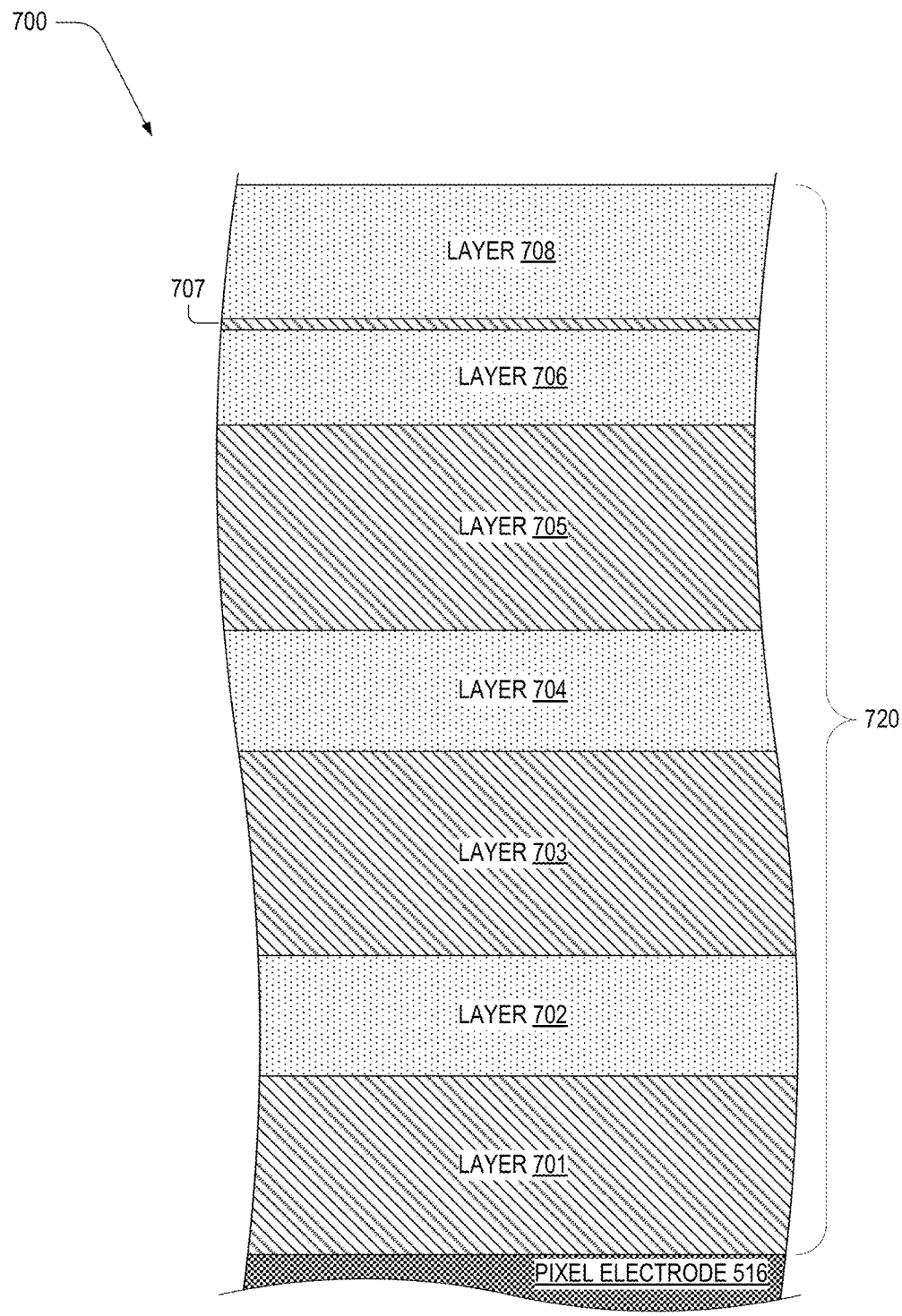
FIG. 7 is a cross-sectional view of an exemplary reflector formed from a reflective coating on a pixel electrode of a highly-reflective LCOS panel, in an embodiment.
Figure 8:
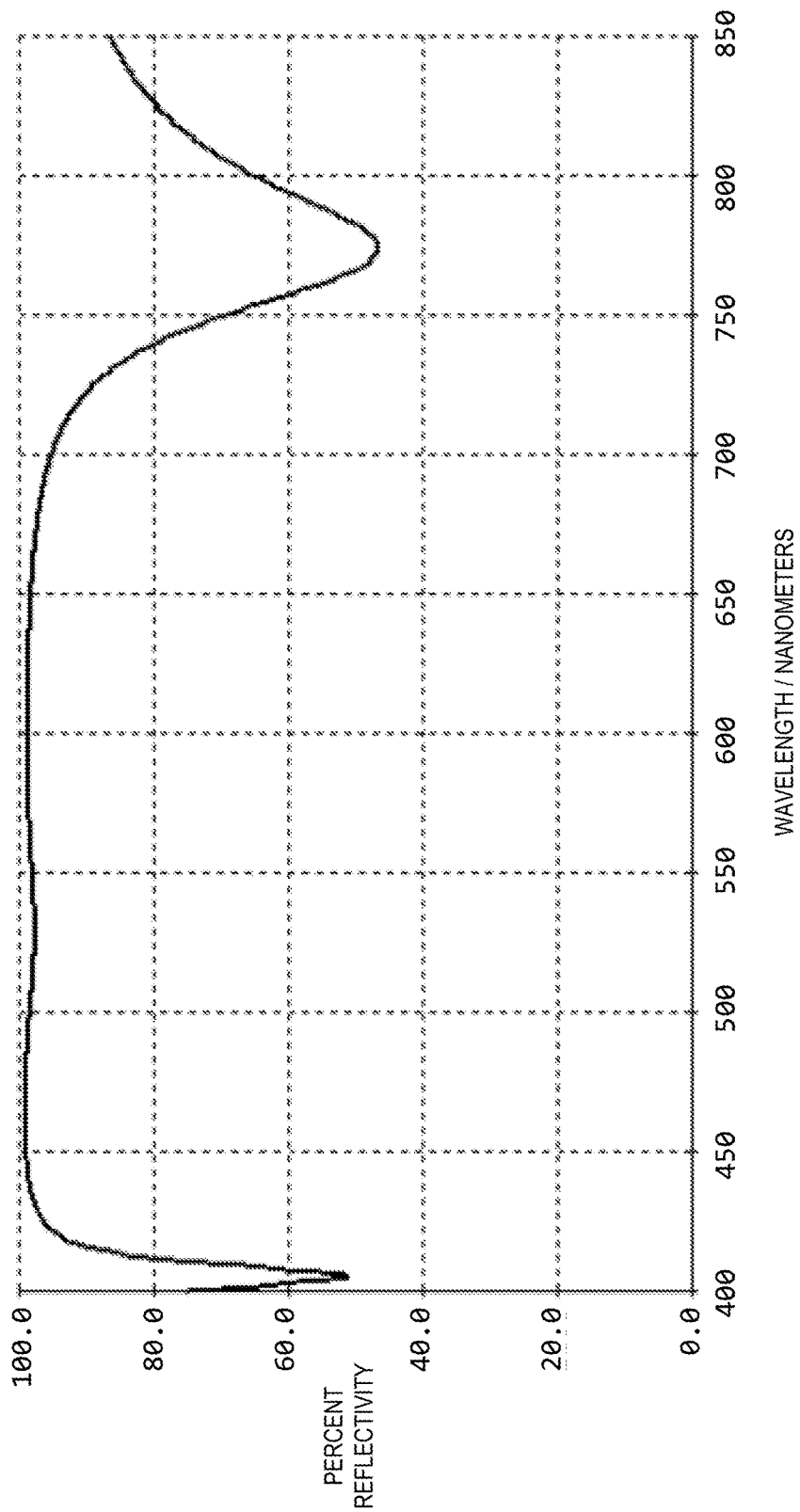
FIG. 8 is a spectral reflectance plot of the reflector of claim 7, in an embodiment.

FIG. 7 is a cross-sectional view of a reflector 700 formed from a reflective coating 720 on pixel electrode 516. Reflective coating 720 is an embodiment of reflective coating 620 and includes eight layers 701-708. Layers 701, 703, 705, and 707 are silicon dioxide (SiO2). Layers 702, 704, 706, and 708 are formed of titanium dioxide (TiO2). FIG. 8 is a simulated spectral reflectivity plot of reflector 700 in highly-reflective LCOS panel 600 in which layers 701-708 have thicknesses of 80.32 nm, 54.07 nm, 92.80 nm, 54.25 nm, 92.83 nm, 42.74 nm, 6.17 nm, and 60.13 nm, respectively. The simulation is computed with an incident medium above cover glass 540 has refractive index n=1.0. Between 425 and 675 nm, reflector 700 has an average reflectance exceeding 98%, which is seven percentage points higher than reflectivity $R_{Al}$ of uncoated aluminum pixel electrodes 216 within prior-art LCOS panel 300.

Reflective coating 720 may be a multilayer coating with more or fewer than seven layers without departing from the scope hereof. At least one layer of reflective coating 720 may be formed of a material other than silicon dioxide and titanium dioxide without departing from the scope hereof.

Referring to FIG. 6 and along axis 691 therein, inter-pixel coating 604 is between isolation layer 612 and layer 701 of reflective coating 620. In an embodiment of highly-reflective LCOS panel 500, the material of inter-pixel coating 604 is the same as the material of layer 701. For example, inter-pixel coating 604 and layer 701 are both silicon dioxide.

Highly-reflective LCOS panel 600 includes inter-pixel regions 695 between isolation layer 612 and bottom alignment layer 628 and inter-pixel substrate surfaces 694 between adjacent pixel electrodes 516. In FIG. 6, inter-pixel substrate surfaces 694 are surfaces of isolation layer 612. Absent inter-pixel coating 604 and reflective coating 620, a gap reflectivity $R_{g0}$ of inter-pixel region 695 is determined by the refractive index of isolation layer 612, distances 693, and the refractive index of light-blocking layer 614. In the presence of inter-pixel coating 604 and reflective coating 620, inter-pixel region 695 may have a gap reflectivity $R_{g1}$ that exceeds gap reflectivity $R_{g0}$.

The quality of images produced by a reflective LCOS panel depends in part on its having a low gap reflectivity, also known as "leakage," as high gap reflectivity decreases image contrast. For example, when LCOS panel 600 operates in projector assembly 141, a contiguous pixel group within pixel array 526 may be instructed to display black, such that the pixel group reflects no light incident thereon from illuminator 110. Yet, the ability of LCOS panel 500 to display black in the region corresponding to the pixel group is limited by a gap reflectivity associated with the inter-pixel region 695 between pixels of the pixel group, which reflect light from illuminator 110 regardless of what signals neighboring pixels receive.

In embodiments of highly-reflective LCOS panel 600 that follow, inter-pixel region 695 differs as a result of different approaches to reduce gap reflectivity $R_{g1}$.

In a first embodiment of highly-reflective LCOS panel 600, inter-pixel coating 604 is an absorptive material at visible wavelengths. For example, inter-pixel coating 604 may be formed of silicon, which has a refractive index n=4.1+0.043 i at $\lambda_0$=546 nm and a corresponding normal-incidence reflectivity of R=37% when the incident medium has a refractive index n=1.0.

Figure 9:
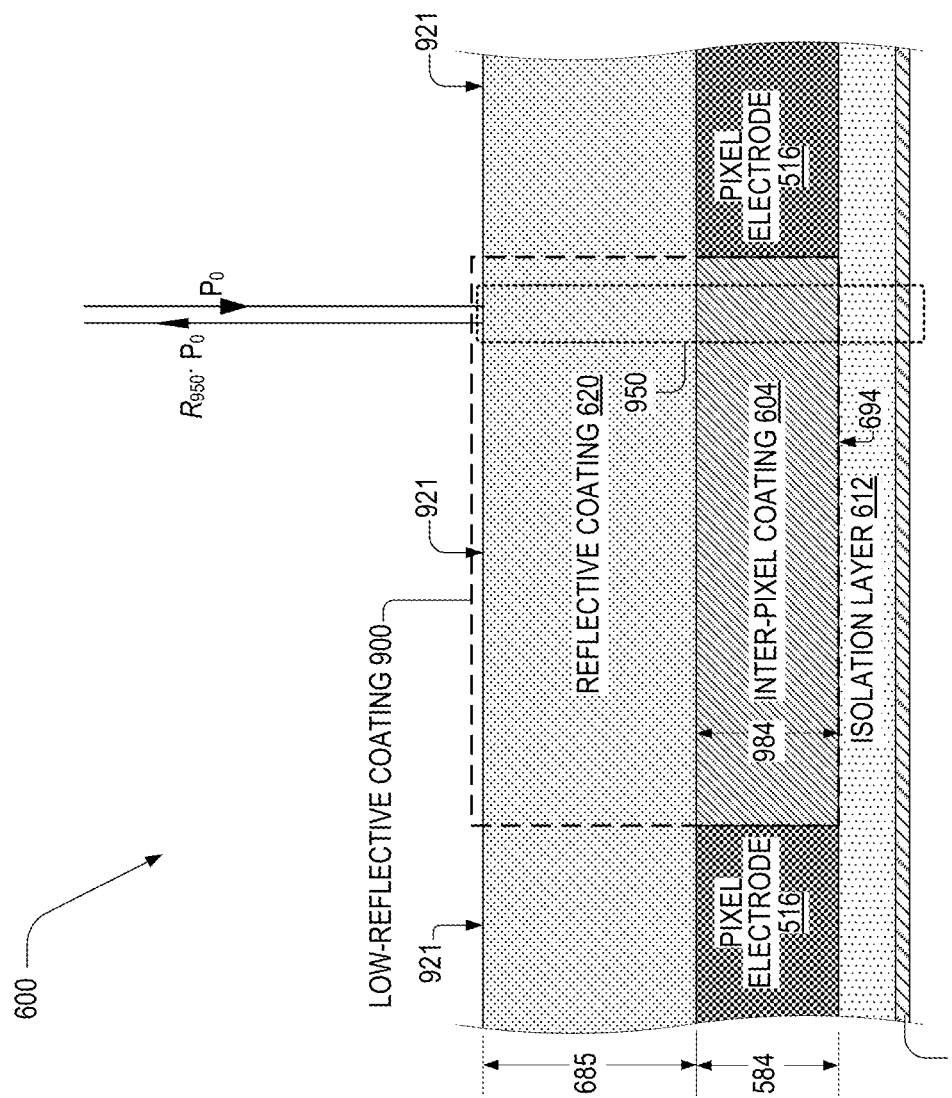
FIG. 9 is a cross-sectional view of an exemplary low-reflective coating between two adjacent pixels of a highly-reflective LCOS panel, in an embodiment.

In a second embodiment of highly-reflective LCOS panel 600, inter-pixel coating 604 is a multi-layer coating designed to minimize reflectivity of visible light when placed between isolation layer 612 and reflective coating 620. For example, FIG. 9 is a cross-sectional view of a low-reflective coating 900 between two adjacent pixel electrodes 516 of highly-reflective LCOS panel 600. Low-reflective coating 900 includes an inter-pixel coating 604 and reflective coating 620, and occupies inter-pixel region 695. Inter-pixel coating 604 may have a height 984 equal to height 584 of pixel electrodes 516. In such a case, reflective coating 620 has a top surface 921 that is planar across pixel array 526, and bottom alignment layer 628 may be formed on a planar surface. For clarity of illustration, FIG. 9 does not include bottom alignment layer 628, liquid crystal layer 530, top alignment layer 639, and cover glass 540.

As illustrated in FIG. 9, a low-reflector 950 includes light-blocking layer 614, isolation layer 612, inter-pixel coating 604, and reflective coating 620. Low-reflector 950 has a reflectivity $R_{950}$ that is less than that of light-blocking layer 614 with isolation layer 612 on it. Low-reflector 950 has a low reflectivity by virtue of inter-pixel coating 604 being optimized to minimize reflectivity of low-reflective coating 900 given predetermined properties (thickness and refractive index, for example) of light-blocking layer 614, isolation layer 612, and reflective coating 620, which are locked during an optimization process. Inter-pixel coating 604 may be designed using commercially available thin-film coating design software such as Essential Macleod.

Figure 10:
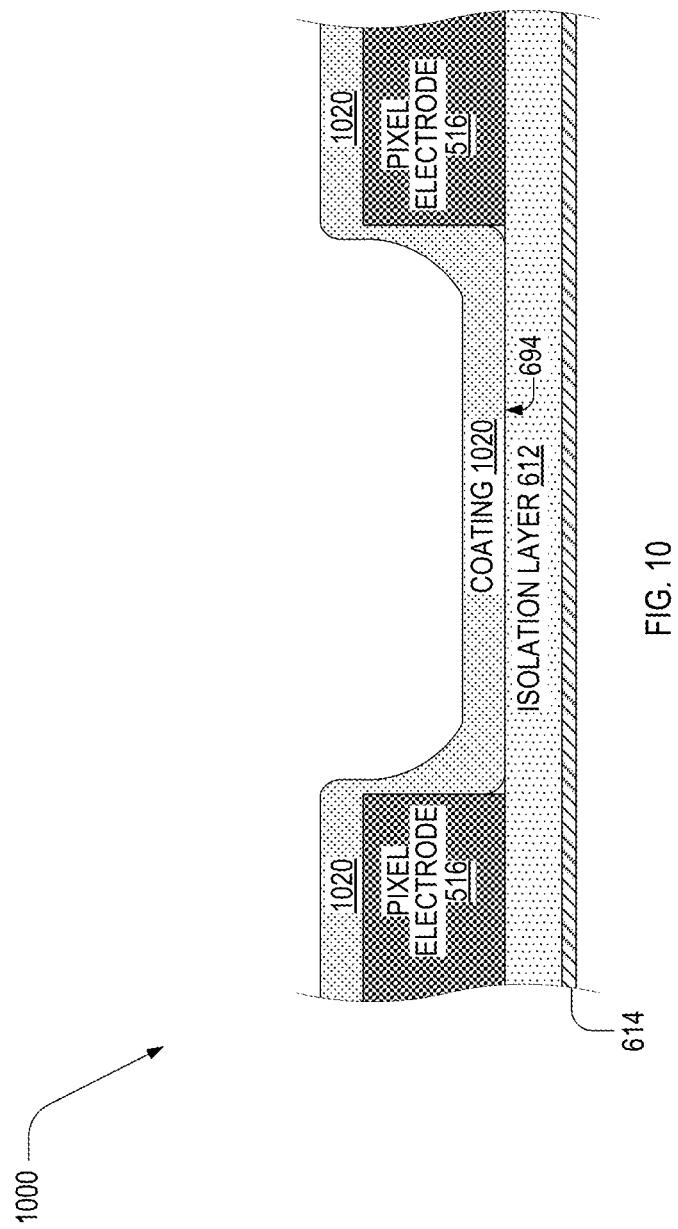
FIG. 10 is a cross-sectional view showing a portion of the highly-reflective LCOS panel of FIG. 5 that lacks inter-pixel coatings, in an embodiment.

FIG. 10 is a cross-sectional view of a highly-reflective LCOS panel 1000, which is equivalent to highly-reflective LCOS panel 600 without inter-pixel coating 604 and with a coating 1020 deposited directly on inter-pixel substrate surfaces 694. Coating 1020 is similar to reflective coating 620. In FIG. 10, the degree of conformality of coating 1020 to surfaces of pixel electrode 516 is shown to illustrate that coating 1020 need not be perfectly conformal, and is not intended to indicate a preferred or actual degree of conformality.

Coating 1020 may be a multilayer coating jointly optimized to maximize reflectivity when on a pixel electrode 516 (a first substrate) while minimizing reflectivity when above isolation layer 612 and light-blocking layer 614 (a second substrate).

Figure 11:
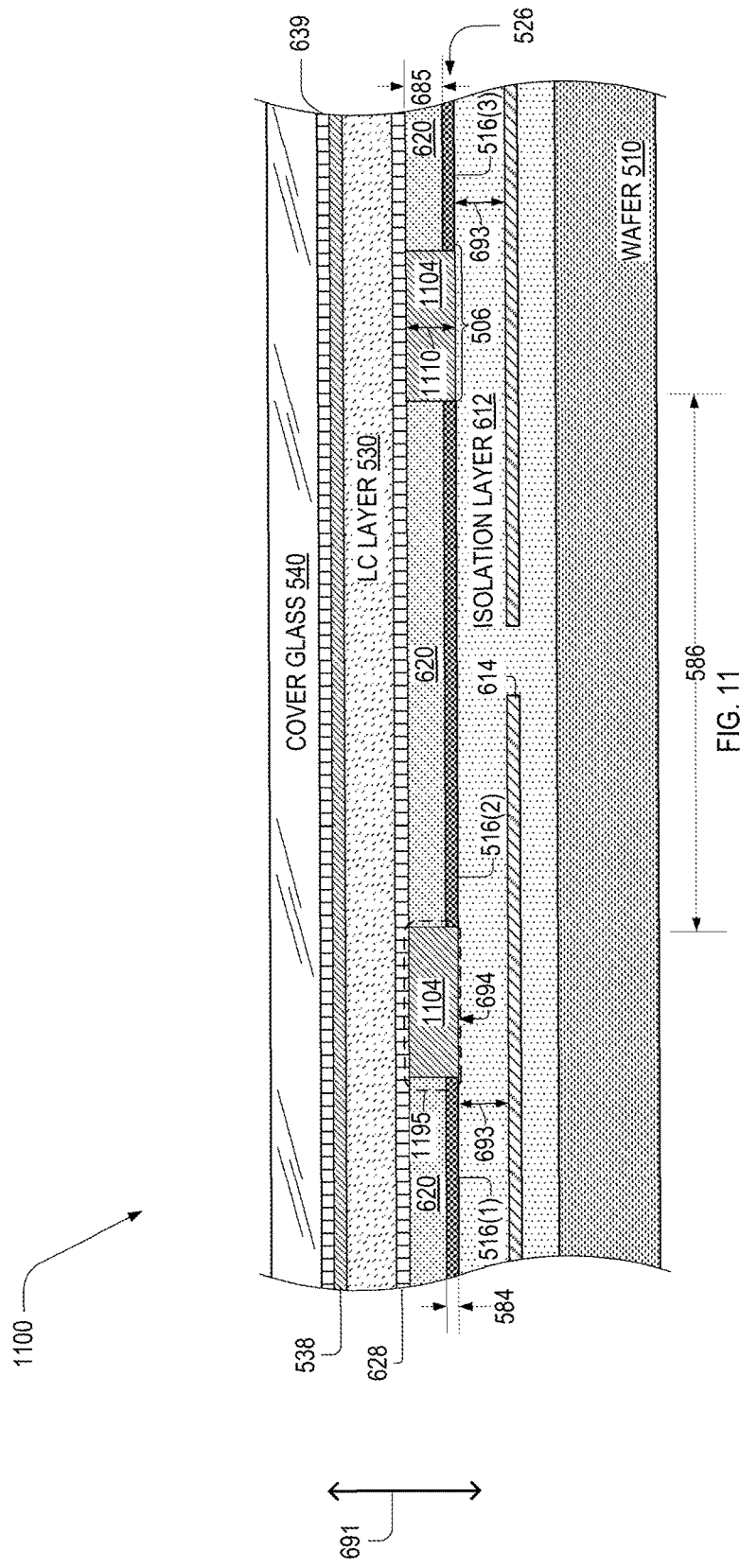
FIG. 11 is a cross-sectional view showing a portion of the highly-reflective LCOS panel of FIG. 5 with anti-reflective coatings between pixel electrodes, in an embodiment.

FIG. 11 is a cross-sectional view of a portion of a highly-reflective LCOS panel 1100. Highly-reflective LCOS panel 1100 is an embodiment of highly-reflective LCOS panel 500 and resembles highly-reflective LCOS panel 600 with the exception of inter-pixel region 1195. In highly-reflective LCOS panel 1100, a reflective coating 620 is above each pixel electrode 516 and does not span inter-pixel regions 1195, as illustrated in FIG. 11. An anti-reflective coating 1104 is between adjacent pixel electrodes 516 of highly-reflective LCOS panel 1100 and has a height 1110. Anti-reflective coating 1104 may be designed with a thin-film design tool known in the art. Anti-reflective coating 1104 may be a multi-layer coating designed to minimize reflectivity of visible light incident on LCOS panel 1100 that reaches coating 1104. Anti-reflective coating 1104 may be optimized to minimize reflectivity of visible light thereon at a single incident angle, normal incidence for example, or for a range of incident angles.

Figure 12:
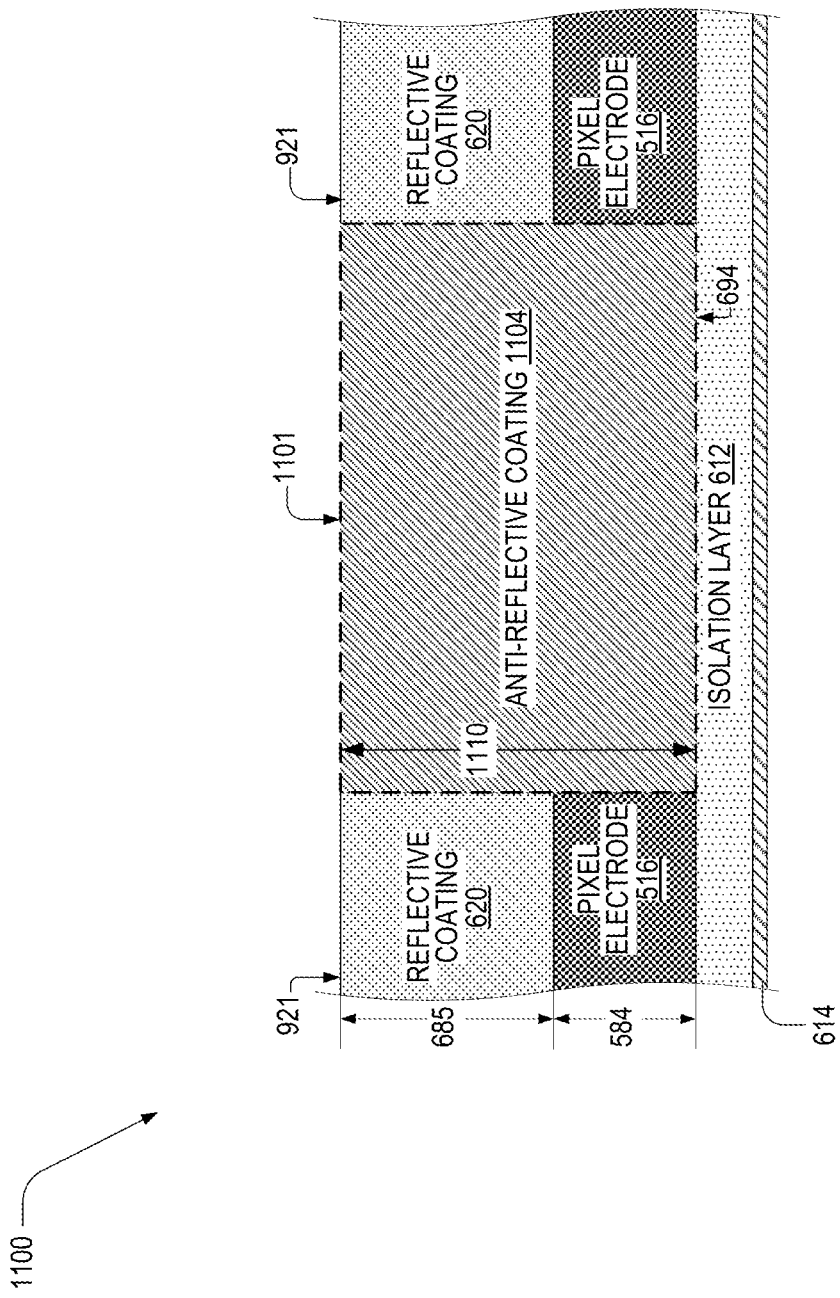
FIG. 12 is a detailed cross-sectional view of the highly-reflective LCOS panel of FIG. 11, in an embodiment.

FIG. 12 is a cross-sectional view of highly-reflective LCOS panel 1100 showing anti-reflective coating 1104 and two adjacent pixel electrodes 516 in greater detail. For clarity of illustration, FIG. 12 does not include bottom alignment layer 628, liquid crystal layer 530, top alignment layer 639, and cover glass 540. Anti-reflective coating 1104 occupies an inter-pixel region 1195 and has a top surface 1101. In an embodiment, height 1110 that may equal the sum of height 584 of pixel electrodes 516 and height 685 of reflective coating 620, such that top surfaces 921 and 1101 are coplanar. In such a case, bottom alignment layer 628 may be formed on a planar surface that includes top surfaces 921 and 1101. In an embodiment, reflective coating 620 is the same as reflective coating 720, shown in FIG. 7.

Highly-reflective LCOS panel 1100 may be formed by modifying highly-reflective LCOS panel 600 via photolithographic and thin-film deposition processes known in the art. For example, low-reflective coating 900 of highly-reflective LCOS panel 600, shown in FIG. 9, may be removed and replaced with anti-reflective coating 1104 of highly-reflective LCOS panel 1100, shown in FIG. 12. Alternatively, highly-reflective LCOS panel 1100 may be formed by depositing anti-reflective coating 1104 before depositing reflective coating 620.

Figure 13:
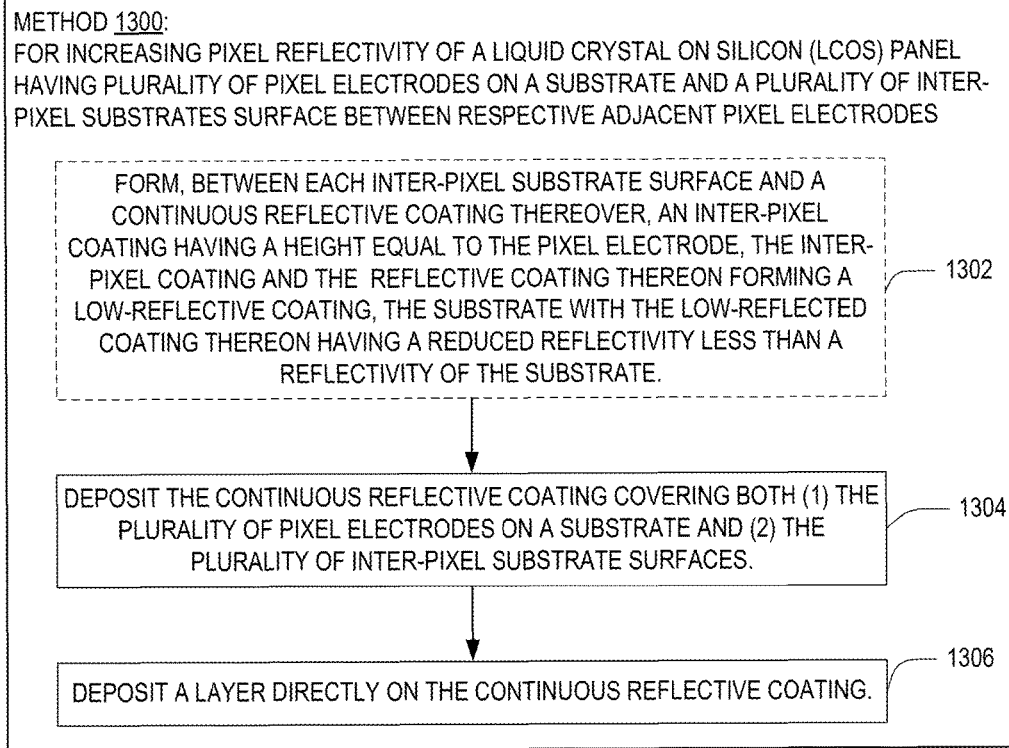
FIG. 13 is a flow chart illustrating a first method for increasing pixel reflectivity of a LCOS panel, in an embodiment.

FIG. 13 is a flow chart illustrating an exemplary method 1300 for increasing pixel reflectivity of an LCOS panel. The LCOS panel includes a plurality of pixel electrodes on a substrate and a plurality of inter-pixel substrates surface between respective adjacent pixel electrodes.

Step 1302 is optional. In optional step 1302, method 1300 forms, between each inter-pixel substrate surface and a reflective coating thereover, an inter-pixel coating having a height equal to a pixel electrode. The inter-pixel coating and the reflective coating thereon form a low-reflective coating. The substrate with the low-reflective coating thereon has a reduced reflectivity less than a reflectivity of the substrate. In an example of step 1302, inter-pixel coating 604 is formed between each inter-pixel substrate surface 694 and reflective coating 620. Inter-pixel coating 604 and reflective coating 620 thereon form low-reflective coating 900. Inter-pixel coating 604 may be confined to the region shown in FIG. 9 via thin-film deposition and photolithography techniques known in the art.

In step 1304, method 1300 deposits the continuous reflective coating covering both (1) the plurality of pixel electrodes on the substrate and (2) the plurality of inter-pixel substrate surfaces. The continuous reflective coating may be a multilayer thin-film coating, and be deposited with methods known in the art. In an example of step 1304, reflective coating 620 is deposited over pixel electrodes 516 and inter-pixel substrate surfaces 694, as shown in FIGS. 6 and 9.

In step 1306, method 1300 deposits a layer directly on the continuous reflective coating. In an example of step 1306, bottom alignment layer 628 is deposited on reflective coating 620.

Figure 14:
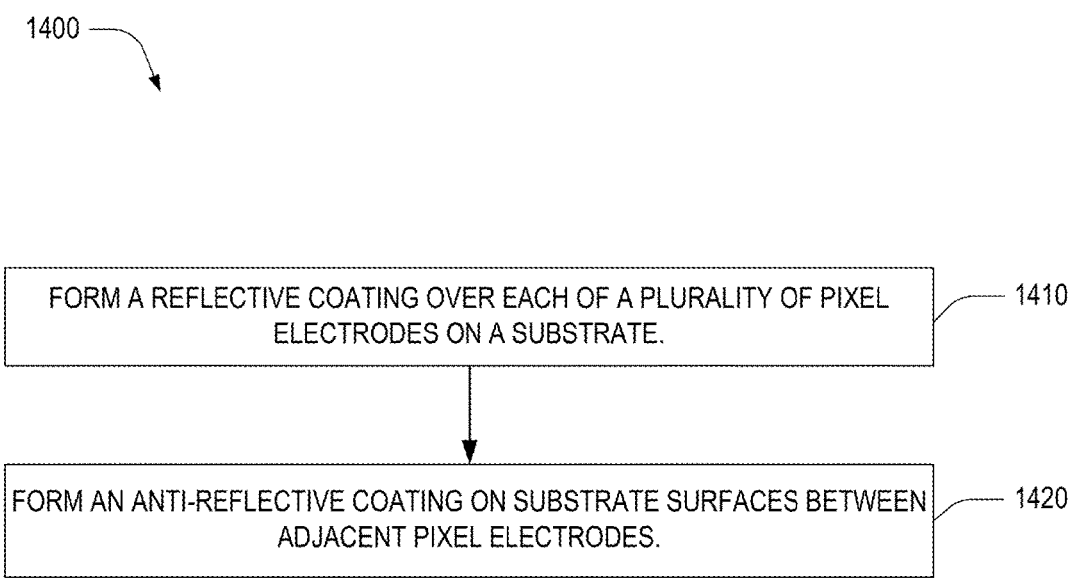
FIG. 14 is a flow chart illustrating a second method for increasing pixel reflectivity of a LCOS panel, in an embodiment.

FIG. 14 is a flow chart illustrating an exemplary method 1400 for increasing pixel reflectivity of an LCOS panel. In step 1410, method 1400 forms a reflective coating over each of a plurality of pixel electrodes on a substrate. In an example of step 1410, reflective coating 620 is formed over each pixel electrode 516 on isolation layer 612, as shown in FIG. 11.

In step 1420, method 1400 forms an anti-reflective coating on a substrate surface between adjacent pixels. In an example of step 1420, anti-reflective coating 1104 is formed on inter-pixel substrate surface 694.

Method 1400 results in a pattern of reflective coatings 620 over pixel electrodes 516 and anti-reflective coating 1104 over inter-pixel substrate surfaces. This pattern by be formed via thin-film deposition and photolithography techniques known in the art.

Combinations of features:

Features described above as well as those claimed below may be combined in various ways without departing from the scope hereof. The following examples illustrate some possible, non-limiting combinations:

(A1) A highly-reflective LCOS panel may include pixel electrodes on a substrate, each pixel electrode having a top surface with a first reflectivity, and a continuous reflective coating covering the pixel electrodes and substrate surfaces therebetween, forming a plurality of coated pixel electrodes having an enhanced reflectivity that exceeds the first reflectivity.

(A2) In the highly-reflective LCOS panel denoted as (A1), each top surface may be at a first height above the substrate and further comprising on substrate regions between adjacent pixel electrodes, an inter-pixel coating between the substrate and the continuous reflective coating, the inter-pixel coating may have a second height equal to the first height such that the inter-pixel coating and pixel electrodes form a planar surface.

(A3) In at least one of the highly-reflective LCOS panels denoted as (A1) and (A2), the inter-pixel coating and the continuous reflective coating thereon may form a low-reflective coating on the substrate, the substrate and the low-reflective coating collectively having a reduced reflectivity less than a reflectivity of the substrate.

(A4) In the highly-reflective LCOS panels denoted as (A3), the inter-pixel coating may include at least one of (1) multiple layers and (2) an absorptive material (A5) In any of the highly-reflective LCOS panels denoted as (A1) through (A4), the enhanced reflectivity may exceed the first reflectivity at all wavelengths between 425 nm and 675 nm.

(A6) In any of the highly-reflective LCOS panels denoted as (A1) through (A5), the continuous reflective coating may be a multi-layer coating.

(A7) Any of the highly-reflective LCOS panels denoted as (A1) through (A6) may further include a bottom alignment layer on a top surface of the continuous reflective coating.

(B1) A highly-reflective LCOS panel may include pixel electrodes on a substrate and having a top surface having a first reflectivity, a reflective coating on each pixel electrode and having a top surface at a first height above the substrate, and an anti-reflective coating on substrate regions between adjacent electrodes and having a second height equal to the first height, the anti-reflective coating and pixel electrodes forming a planar surface. The pixel electrodes with the reflective coating thereon may have an enhanced reflectivity that exceeds the first reflectivity. The substrate with the anti-reflective coating thereon may have a reduced reflectivity less than a reflectivity of the substrate.

(B2) In the highly-reflective LCOS panel denoted as (B1), the anti-reflective coating may include at least one of (1) multiple layers and (2) an absorptive material (B3) In at least one of the highly-reflective LCOS panels denoted as (B1) and (B2), the reflective coating may be a multi-layer coating.

(B4) Any of the highly-reflective LCOS panels denoted as (B1) through (B3) may further include a bottom alignment layer on a top surface of the reflective coating.

(B5) In any of the highly-reflective LCOS panels denoted as (B1) through (B4), the enhanced reflectivity may exceed the first reflectivity at all wavelengths between 425 nm and 675 nm.

(C1) A method for increasing pixel reflectivity in a LCOS panel may include depositing a continuous reflective coating covering both (1) a plurality of pixel electrodes on a substrate and (2) a plurality of inter-pixel substrate surfaces. The method may also include depositing a layer on the continuous reflective coating.

(C2) In the method denotes as (C1), the layer may be an alignment layer.

(C3) At least one of the methods denoted as (C1) and (C2) may further include, before the step of depositing the continuous reflective coating, forming, between each inter-pixel substrate surface and the continuous reflective coating thereover, an inter-pixel coating having a height equal to a pixel electrode. The inter-pixel coating and the reflective coating thereon may form a low-reflective coating on the inter-pixel substrate surfaces, the substrate with the low-reflective coating thereon having a reduced reflectivity less than a reflectivity of the substrate.

(C4) Any of the methods denoted as (C1) through (C3) may further include steps of removing portions of the continuous reflective coating between adjacent pixel electrodes and forming an anti-reflective coating between adjacent pixel electrodes.

(C5) In the method denoted as (C4), the continuous reflective coating may have a top surface at a first height above the substrate, and the anti-reflective coating may have a top surface at a second height above the substrate equal to the first height.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A highly-reflective liquid crystal on silicon (LCOS) panel comprising:
    pixel electrodes on an isolation layer, each pixel electrode having a top surface, at a first height above the isolation layer, and each pixel electrode having a first reflectivity; and
    a continuous reflective coating covering the pixel electrodes and surfaces of the isolation layer therebetween, forming a plurality of coated pixel electrodes having an enhanced reflectivity that exceeds the first reflectivity; and
    on isolation layer regions between adjacent pixel electrodes, an inter-pixel coating between the isolation layer and the continuous reflective coating, the inter-pixel coating having a second height equal to the first height such that the inter-pixel coating and pixel electrodes form a planar surface.

2. The highly-reflective LCOS panel of claim 1, the inter-pixel coating and the continuous reflective coating thereon forming a low-reflective coating on the isolation layer, the isolation layer and the low-reflective coating collectively having a reduced reflectivity less than a reflectivity of the isolation layer.

3. The highly-reflective LCOS panel of claim 1, the inter-pixel coating comprising at least one of (1) multiple layers and (2) an absorptive material.

4. The highly-reflective LCOS panel of claim 1, the enhanced reflectivity exceeding the first reflectivity at all wavelengths between 425 nm and 675 nm.

5. The highly-reflective LCOS panel of claim 1, the continuous reflective coating being a multi-layer coating.

6. The highly-reflective LCOS panel of claim 1, further comprising a bottom alignment layer on a top surface of the continuous reflective coating.

* * * * *